US012792110B2

(12) United States Patent
Wang et al.

(10) Patent No.: US 12,792,110 B2
(45) Date of Patent: Nov. 10, 2026

(54) COMMON HOUSING SYSTEM FOR ACCOMMODATING INFORMATION HANDLING RESOURCES HAVING DIFFERENT FORM FACTORS

(71) Applicant: Dell Products L.P., Round Rock, TX (US)

(72) Inventors: Ching-Yuan Wang, New Taipei City (TW); Raymond DeWine Heistand, II, Round Rock, TX (US); William Andrew Smith, Round Rock, TX (US); Yi-Chang Chen, New Taipei City (TW); Liang-Chun Ma, Taipei City (TW)

(73) Assignee: Dell Products L.P., Round Rock, TX (US)

( * ) Notice: Subject to any disclaimer, the term of this patent is extended or adjusted under 35 U.S.C. 154(b) by 186 days.

(21) Appl. No.: 18/409,219

(22) Filed: Jan. 10, 2024

(65) Prior Publication Data

US 2025/0224776 A1 Jul. 10, 2025

(51) Int. Cl.
*G06F 1/187* (2026.01)
*G06F 1/183* (2026.01)
*G06F 1/184* (2026.01)
*G06F 1/185* (2026.01)
*G06F 1/186* (2026.01)
*G06F 1/188* (2026.01)

(52) U.S. Cl.
CPC .............. *G06F 1/187* (2013.01); *G06F 1/183* (2013.01); *G06F 1/184* (2013.01); *G06F 1/185* (2013.01); *G06F 1/186* (2013.01); *G06F 1/188* (2013.01)

(58) Field of Classification Search
CPC .......... G06F 1/183; G06F 1/184; G06F 1/185; G06F 1/186; G06F 1/187; G06F 1/188; H05K 7/1487
See application file for complete search history.

(56) References Cited

U.S. PATENT DOCUMENTS

| | | | | |
|---|---|---|---|---|
| 5,943,208 A * | 8/1999 | Kato | G06F 1/184 | |
| 6,373,706 B1 * | 4/2002 | Kasahara | G06F 1/1635 | 439/928.1 |
| 6,893,268 B1 * | 5/2005 | Harari | G06F 13/4068 | 439/43 |
| 7,277,296 B2 * | 10/2007 | Ice | H05K 7/1404 | 361/756 |
| 7,460,365 B2 * | 12/2008 | Morris | G06F 1/187 | 361/679.33 |
| 7,499,286 B2 * | 3/2009 | Berke | H05K 7/1487 | 361/756 |
| 7,535,697 B2 * | 5/2009 | Robertson | G06F 1/187 | 361/679.38 |
| 7,558,074 B2 * | 7/2009 | Liang | G06F 1/183 | 361/728 |

(Continued)

*Primary Examiner* — Nidhi Thaker
(74) *Attorney, Agent, or Firm* — Jackson Walker L.L.P.

(57) ABSTRACT

A system may include a housing comprising a plurality of slots. Each slot may comprise a first set of adapter alignment features and a second set of adapter alignment features. The first set of adapter alignment features and the second set of adapter alignment features may each be configured to mechanically couple to a form factor adapter. The form factor adapter may be configured to receive one or more information handling resources.

11 Claims, 5 Drawing Sheets

(56) References Cited

U.S. PATENT DOCUMENTS

| | | | | |
|---|---|---|---|---|
| 7,864,519 | B2 * | 1/2011 | Lin | G11B 33/128<br>361/679.33 |
| 9,025,276 | B1 * | 5/2015 | Fairchild | G11B 33/022<br>360/97.13 |
| 9,320,169 | B2 * | 4/2016 | Adrian | G06F 1/187 |
| 9,867,306 | B2 * | 1/2018 | Cheng | H05K 7/1418 |
| 10,470,335 | B2 * | 11/2019 | Gupta | G06F 1/16 |
| 2003/0095377 | A1 * | 5/2003 | Goodman | G06F 1/184<br>361/725 |
| 2008/0055875 | A1 * | 3/2008 | Berke | H05K 7/1487<br>361/800 |
| 2008/0180902 | A1 * | 7/2008 | Bassett | G06F 1/187<br>361/679.31 |
| 2020/0393878 | A1 * | 12/2020 | Tiritilli | G06F 1/182 |
| 2021/0181812 | A1 * | 6/2021 | Tsorng | G06F 1/184 |
| 2022/0121251 | A1 * | 4/2022 | Chang | G06F 1/187 |
| 2024/0314959 | A1 * | 9/2024 | Chen | G06F 1/185 |
| 2025/0234477 | A1 * | 7/2025 | Lin | G06F 1/187 |

* cited by examiner

COMMON HOUSING SYSTEM FOR ACCOMMODATING INFORMATION HANDLING RESOURCES HAVING DIFFERENT FORM FACTORS

TECHNICAL FIELD

The present disclosure relates in general to information handling systems, and more particularly to systems and methods for housing information handling resources having different form factors in a common housing.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Oftentimes, information handling systems and other information handling resources (e.g., storage devices, input/output devices, and other peripheral devices) are each manufactured in a modular form factor and may be configured to be disposed in a chassis configured to receive such modular components. Such a chassis and its component modular information handling systems and information handling resources typically include various rails, carriers, and other mechanical components allowing for a person to add and remove the modular information handling systems and information handling resources from the chassis.

Increasingly, information handling resources (e.g., storage resources) are manufactured according to different form factors (e.g., 2.5" and 3.5" solid-state drives). Current industry practice is to manufacture different housings to accommodate different form factors, which increases costs and supply chain complexity. Currently, no housing capable of accommodating information handling resources having different form factors exists. Accordingly, systems and methods for accommodating mixed information handling resource installations in a single housing are desirable.

SUMMARY

In accordance with the teachings of the present disclosure, the disadvantages and problems associated with existing approaches to accommodate different information handling resource form factors may be reduced or eliminated. In accordance with embodiments of the present disclosure, a system may include a housing comprising a plurality of slots. Each slot may comprise a first set of adapter alignment features and a second set of adapter alignment features. The first set of adapter alignment features and the second set of adapter alignment features may each be configured to mechanically couple to a form factor adapter. The form factor adapter may be configured to receive one or more information handling resources.

In accordance with embodiments of the present disclosure, a form factor adapter may include a connector assembly comprising one or more connector features configured to mechanically and electrically couple to one or more information handling resources, a circuit board mechanically and electrically coupled to the connector assembly and configured to electrically couple the one or more information handling resources to another circuit board, and a bracket mechanically coupled to the circuit board and comprising a plurality of housing alignment features configured to mechanically couple the form factor adapter to a housing.

In accordance with embodiments of the present disclosure, a method of making a form factor adapter may include mechanically and electrically coupling a connector assembly to a circuit board, the connector assembly configured to mechanically and electrically couple to one or more information handling resources, and mechanically coupling a bracket to the circuit board. The bracket may comprise a plurality of housing alignment features configured to mechanically couple the form factor adapter to a housing.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1A:
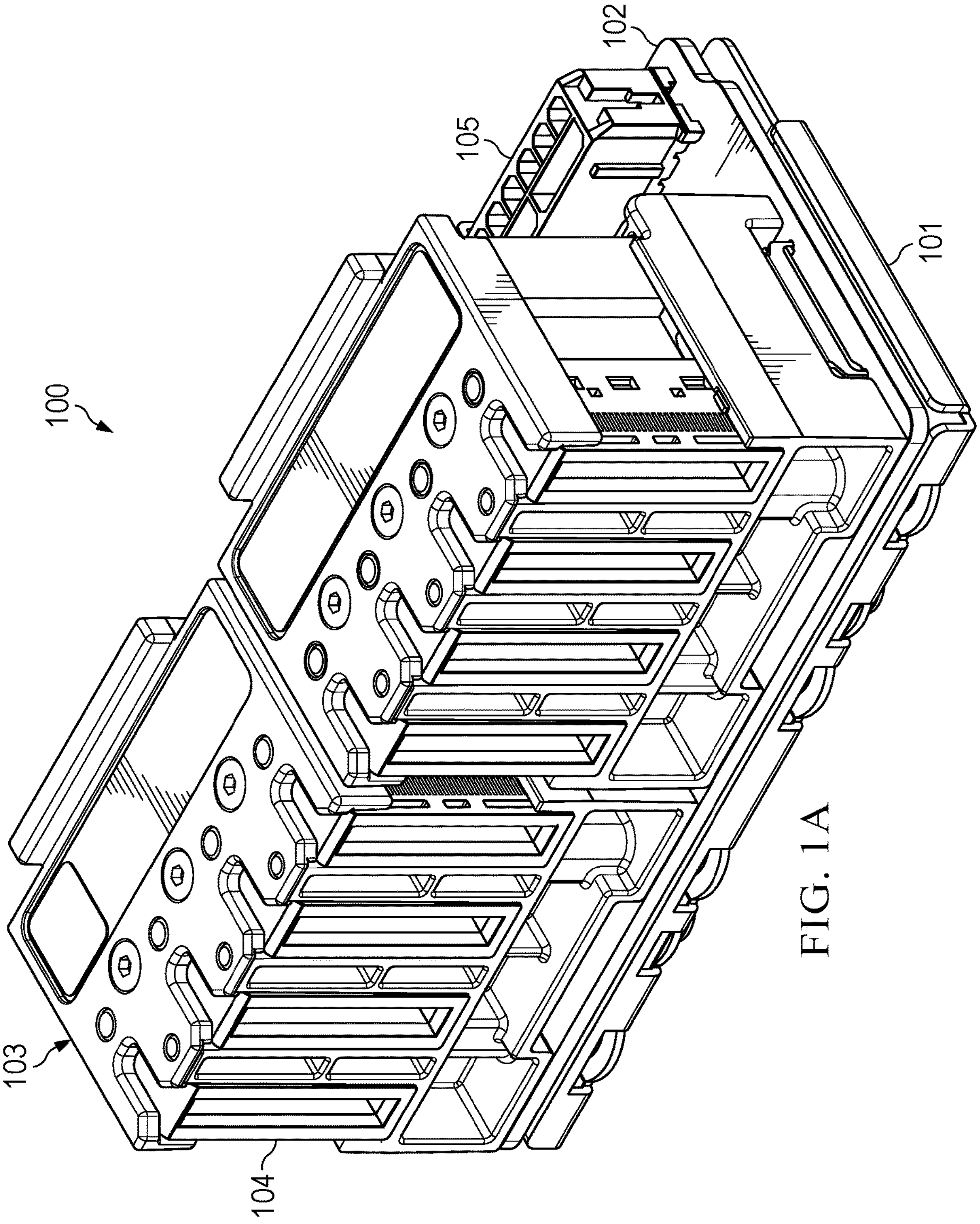
FIG. 1A illustrates a perspective front view of an example short to long form factor adapter, in accordance with embodiments of the present disclosure.

Preferred embodiments and their advantages are best understood by reference to FIGS. 1 through 4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk resource or floppy disk), a sequential access storage device (e.g., a tape disk resource), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

For the purposes of this disclosure, a circuit board may broadly refer to a printed circuit board (PCB), printed wiring board (PWB), printed wiring assembly (PWA) etched wiring board, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

FIG. 1A illustrates a perspective front view of an example short to long form factor adapter 100 in accordance with embodiments of the present disclosure. As shown in FIG. 1A, in some embodiments adapter 100 may comprise a bracket 101 mechanically coupled to a printed circuit board 102, which in turn may be electrically and mechanically coupled to a connector assembly 103. As described below, connector assembly 103 may comprise a plurality of connector features 104, which may each electrically and mechanically couple to an information handling resource 203 (e.g., a storage resource) (see FIG. 2).

Connector features 104 may be arranged within connector assembly 103 such that information handling resources 203 having differing widths (e.g., 2T or 1T) may electrically and mechanically couple to connector assembly 103. Printed circuit board 102 may further comprise one or more receptacle connectors 105 mounted thereon, which may electrically couple information handling resource 203 to another circuit board (e.g., a motherboard) via cables. While FIG. 1A shows connector assembly 103 comprising eight connector features 104, connector assembly 103 may comprise any suitable number of connector features 104.

Figure 1B:
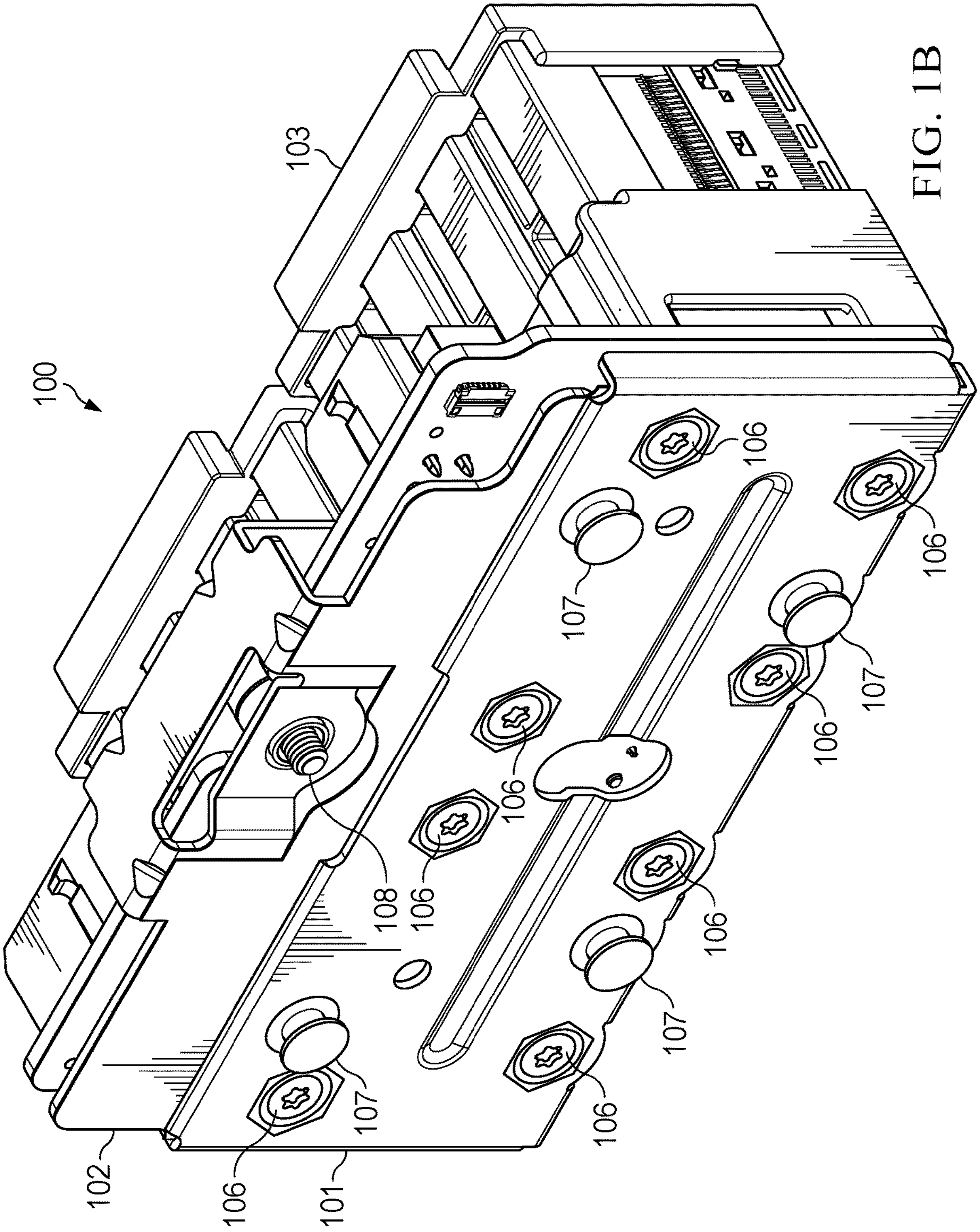
FIG. 1B illustrates a perspective rear view of an example short to long form factor adapter, in accordance with embodiments of the present disclosure.

FIG. 1B illustrates a perspective rear view of an example short to long form factor adapter 100, in accordance with embodiments of the present disclosure. As shown in FIG. 1B, in some embodiments bracket 101 may mechanically couple to printed circuit board 102 and connector assembly 103 via one or more fasteners 106. Adapter 100 may comprise one or more housing alignment features 107 extending from and mechanically coupled to a surface of bracket 101. In some embodiments, housing alignment features 107 may extend substantially perpendicular to the surface of bracket 101. Housing alignment features 107 may be implemented in any suitable manner, including as T-shaped standoffs as shown in FIG. 1B. As described in greater detail below, housing alignment features 107 may mechanically engage with corresponding adapter alignment features 201 of housing 200 in order to mechanically align adapter 100 at a desired position within housing 200.

Figure 2:
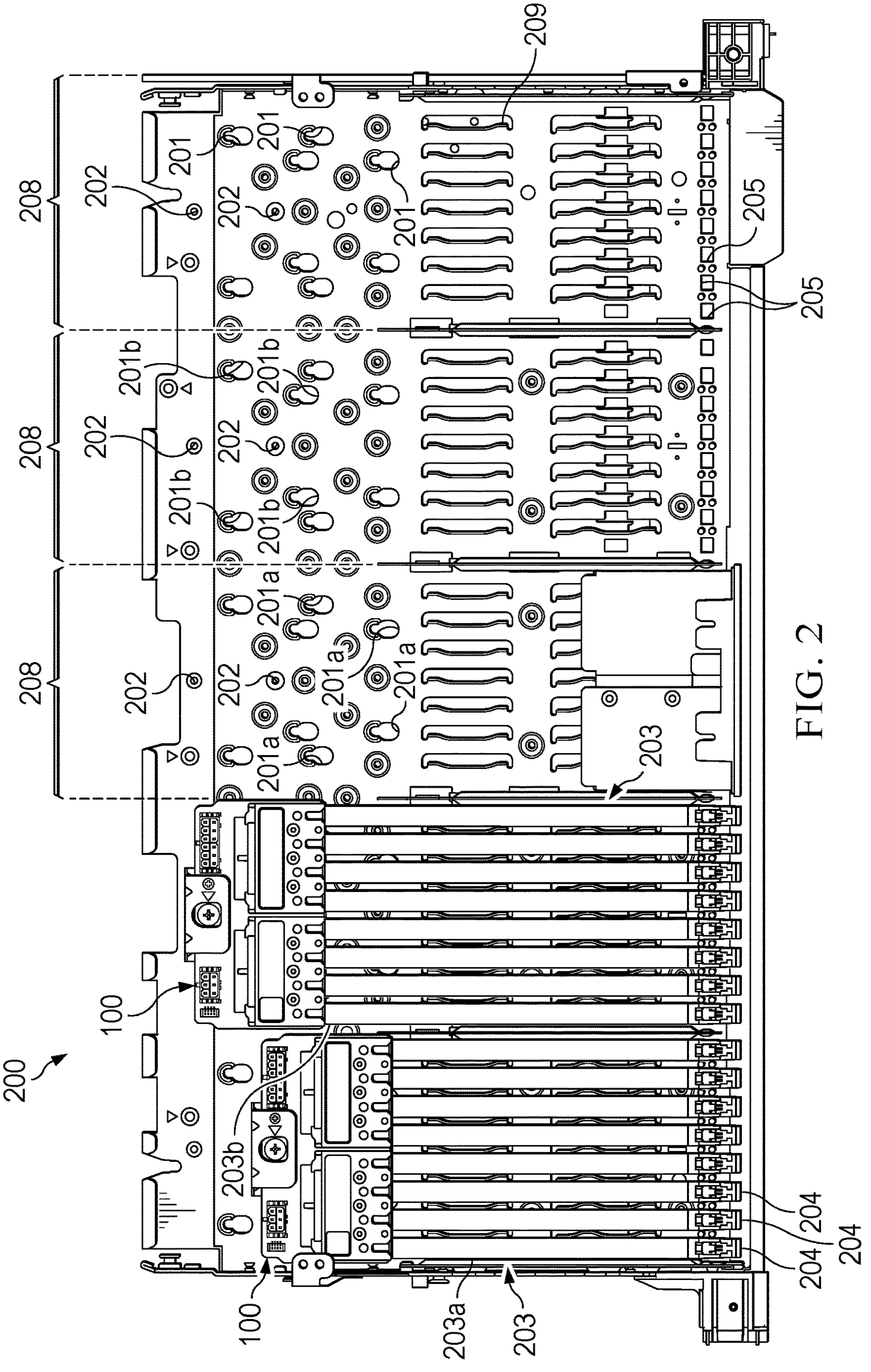
FIG. 2 illustrates a plan view of an example housing, with portions removed for purposes of clarity and exposition, mechanically coupled to example short to long form factor adapters configured to receive example information handling resources, in accordance with embodiments of the present disclosure.

FIG. 2 illustrates a plan view of an example housing 200, with portions removed for purposes of clarity and exposition, mechanically coupled to example short to long form factor adapters 100, in accordance with embodiments of the present disclosure. As shown in FIG. 2, housing 200 may comprise a plurality of adapter alignment features 201. Adapter alignment features 201 may be organized within "slots" or areas 208 of housing 200 such that each slot 208 may comprise a first set of adapter alignment features 201*a* and a second set of adapter alignment features 201*b*. Each set of adapter alignment features may be located proximate to a first edge of housing 200. Adapter alignment features 201 may be implemented in any suitable manner. For example, adapter alignment features 201 may be implemented as elongated recesses in housing 200, as shown in FIG. 2.

Accordingly, in some embodiments, housing alignment features 107 of adapter 100 may "slide" or "snap" into adapter alignment features 201 of housing 200 to mechanically couple adapter 100 to a desired position within housing 200. In some embodiments, adapter 100 may additionally mechanically couple to housing 200 via a fastener 108 (e.g., a screw) extending through a through-hole of bracket 101 and a recess 202 of housing 200. Information handling resources 203 may further mechanically couple to housing 200 near a second edge of housing 200 via connectors 204 and/or recesses 205.

While the terms "front" and "rear" are used for purposes of clarity and exposition, such terms are not intended to limit adapter 100 or housing 200 to a particular orientation or configuration.

As further shown in FIG. 2, housing 200 may accommodate different form factors of information handling resources 203. In some embodiments, adapter 100 may mechanically couple to the first set of adapter alignment features 201*a* within a slot 208 of housing 200 such that information handling resources 203*a* having a first length (e.g., E3.S form factor) may mechanically couple to adapter 100. Adapter 100 may alternatively mechanically couple to the second set of adapter alignment features 201*b* within slot 208 of housing 200 such that information handling resources 203*b* having a second length (e.g., E3.L form factor) may mechanically couple to adapter 100.

As further shown in FIG. 2 and described in greater detail below, housing 200 may further comprise a plurality of rails 209 extending therefrom, which may be arranged to facilitate installation of information handling resources 203 within housing 200.

Figure 3:
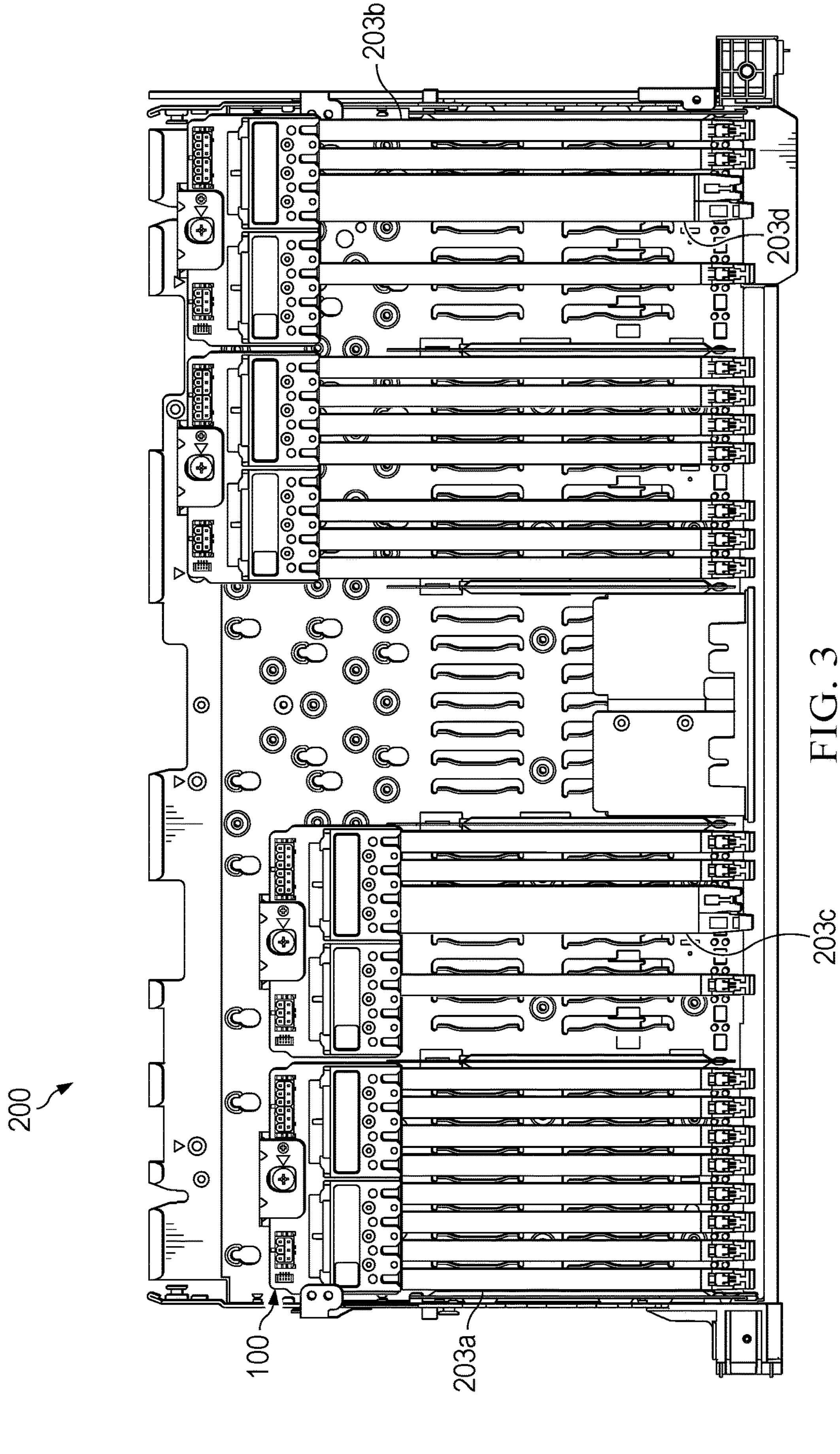
FIG. 3 illustrates a plan view of an example housing, with portions removed for purposes of clarity and exposition, mechanically coupled to example short to long form factor adapters configured to receive example information handling resources having different form factors, in accordance with embodiments of the present disclosure.

FIG. 3 illustrates a plan view of an example housing 200 mechanically coupled to example short to long form factor adapters 100 mechanically and electrically coupled to example information handling resources 203 having different form factors, in accordance with embodiments of the present disclosure. As shown in FIG. 3, in some embodiments housing 200 may accommodate information handling resources 203 having different form factors, including but not limited to, information handling resources 203*a* having a first length and a first width (e.g., E3.S 1T), information handling resources 203*b* having a second length and the first width (e.g., E3.L 1T), information handling resources 203*c* having the first length and a second width (e.g., E3.S 2T), and information handling resources 203*d* having the second length and the second width (e.g., E3.L 2T).

Figure 4:
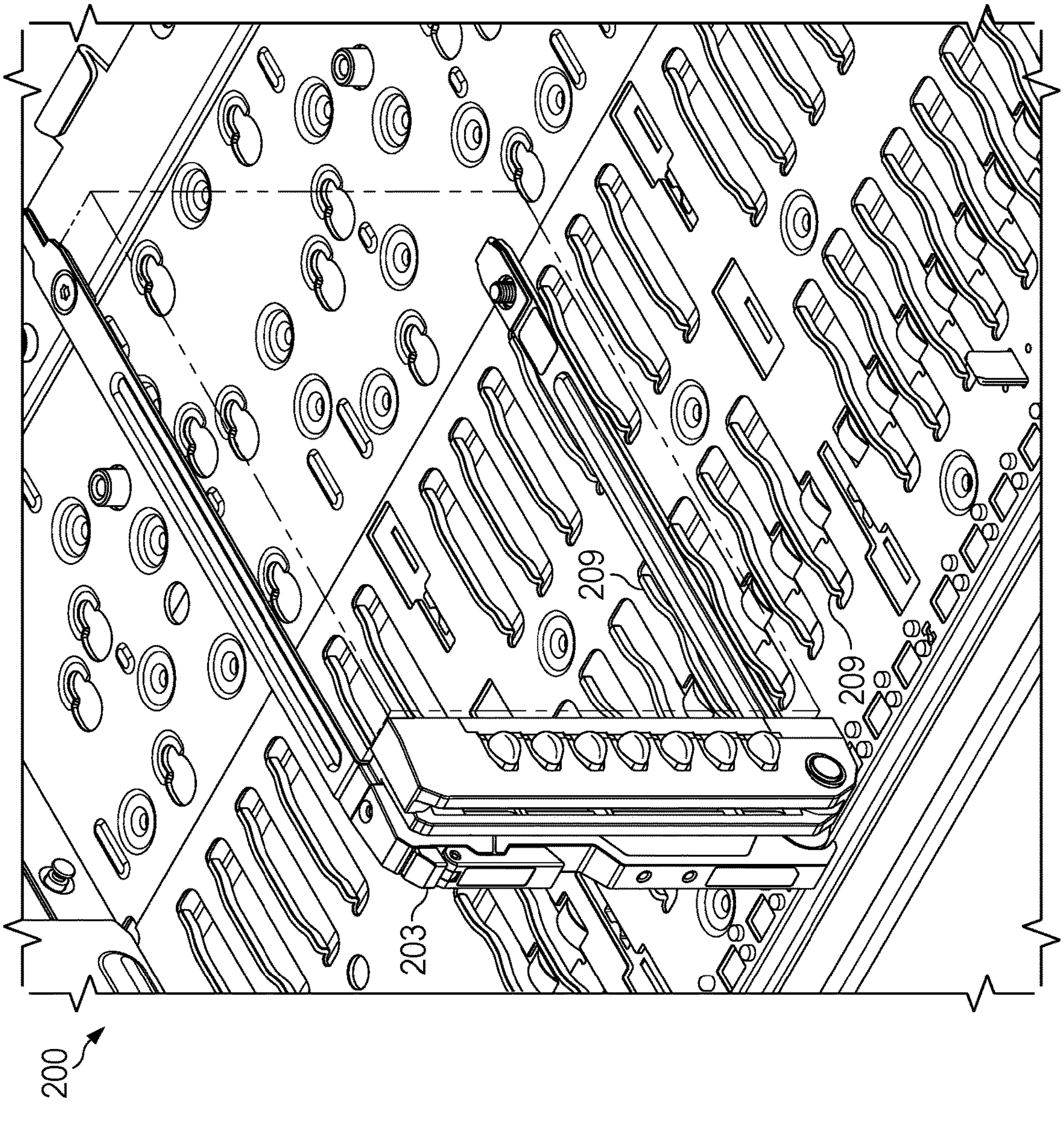
FIG. 4 illustrates a perspective view of an example housing comprising a plurality of rails to guide installation of information handling resources, in accordance with embodiments of the present disclosure.

FIG. 4 illustrates a perspective view of an example housing 200 with rails 209 to guide installation of information handling resources 203. As shown in FIG. 4, housing 200 may further comprise a plurality of rails 209 extending therefrom and arranged to facilitate the mechanical and electrical coupling of information handling resources 203 to adapter 100. Rails 209 may be arranged on either side of information handling resource 203 to guide information handling resource 203 installation.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:

a housing comprising a plurality of slots, wherein each slot comprises a first set of adapter alignment features and a second set of adapter alignment features, wherein the first set of adapter alignment features and the second set of adapter alignment features are each configured to mechanically couple to a form factor adapter configured to receive a plurality of information handling resources, and wherein the first set of adapter alignment features is offset from the second set of adapter alignment features such that a position of the form factor adapter changes depending on whether the form factor adapter is coupled to the first set of adapter alignment features or to the second set of adapter alignment features.

2. The system of claim 1, further comprising the form factor adapter, wherein the form factor adapter comprises:

a connector assembly comprising a plurality of connector features configured to mechanically and electrically couple to the plurality of information handling resources;

a circuit board mechanically and electrically coupled to the connector assembly, wherein the circuit board is configured to electrically couple the plurality of information handling resources to another circuit board; and a bracket mechanically coupled to the circuit board, the bracket comprising a plurality of housing alignment features configured to mechanically couple the form factor adapter to the housing via the first set of adapter alignment features or the second set of adapter alignment features.

3. The system of claim 2, the plurality of housing alignment features extending substantially perpendicular from a surface of the bracket.

4. The system of claim 1, wherein the plurality of information handling resources is selected from the group consisting of an information handling resource having a first length and a first width, an information handling resource having the first length and a second width, an information handling resource having a second length and the first width, and an information handling resource having the second length and the second width.

5. The system of claim 1, the housing further comprising a plurality of rails configured to guide mechanical and electrical coupling of the plurality of information handling resources to the form factor adapter.

6. A form factor adapter comprising:

a connector assembly comprising a plurality of connector features configured to mechanically and electrically couple to a plurality of information handling resources;

a circuit board mechanically and electrically coupled to the connector assembly, wherein the circuit board is configured to electrically couple the plurality of information handling resources to another circuit board; and a bracket mechanically coupled to the circuit board, the bracket comprising a plurality of housing alignment features configured to mechanically couple the form factor adapter to a housing, wherein the housing comprises:

a plurality of slots, wherein each slot comprises a first set of adapter alignment features and a second set of adapter alignment features, wherein the first set of adapter alignment features and the second set of adapter alignment features are each configured to mechanically couple to the form factor adapter, and wherein the first set of adapter alignment features is offset from the second set of adapter alignment features such that a position of the form factor adapter changes depending on whether the form factor adapter is coupled to the first set of adapter alignment features or to the second set of adapter alignment features.

7. The form factor adapter of claim 6, the plurality of housing alignment features extending substantially perpendicular from a surface of the bracket.

8. The form factor adapter of claim 6, wherein the plurality of information handling resources is selected from the group consisting of an information handling resource having a first length and a first width, an information handling resource having the first length and a second width, an information handling resource having a second length and the first width, and an information handling resource having the second length and the second width.

9. A method of making a form factor adapter, comprising:

mechanically and electrically coupling a connector assembly to a circuit board, wherein the connector assembly is configured to mechanically and electrically couple to a plurality of information handling resources; and mechanically coupling a bracket to the circuit board, wherein the bracket comprises a plurality of housing alignment features configured to mechanically couple the form factor adapter to a housing, wherein the housing comprises:

a plurality of slots, wherein each slot comprises a first set of adapter alignment features and a second set of adapter alignment features, wherein the first set of adapter alignment features and the second set of adapter alignment features are each configured to mechanically couple to the form factor adapter, and wherein the first set of adapter alignment features is offset from the second set of adapter alignment features such that a position of the form factor adapter changes depending on whether the form factor adapter is coupled to the first set of adapter alignment features or to the second set of adapter alignment features.

10. The method of claim 9, the plurality of housing alignment features extending substantially perpendicular from a surface of the bracket.

11. The method of claim 9, wherein the plurality of information handling resources is selected from the group consisting of an information handling resource having a first length and a first width, an information handling resource having the first length and a second width, an information handling resource having a second length and the first width, and an information handling resource having the second length and the second width.

* * * * *